United States Patent [19]
Yamada et al.

[11] 4,319,006
[45] Mar. 9, 1982

[54] POLYAMIDEIMIDE-ESTERIMIDE HEAT RESISTANT RESIN AND ELECTRIC INSULATING VARNISH

[75] Inventors: Shigeru Yamada, Tokyo; Tadao Ikeda, Kawaguchi, both of Japan

[73] Assignees: Dainichiseika Color & Chemicals Mfg. Co. Ltd., Nihonbashi; Ukima Colour & Chemicals Mfg. Co. Ltd., Tokyo, both of Japan

[21] Appl. No.: 210,350

[22] Filed: Nov. 25, 1980

[30] Foreign Application Priority Data
Jan. 31, 1980 [JP] Japan ...................... 55/9322

[51] Int. Cl.³ .................. C08L 79/08; C08L 75/06
[52] U.S. Cl. ................................ 525/424; 428/379; 525/425; 525/428; 525/429; 525/436
[58] Field of Search ............... 525/424, 428, 425, 420, 525/429; 260/33.4 R

[56] References Cited
U.S. PATENT DOCUMENTS

| 3,425,866 | 2/1969 | Meyer et al. | 117/218 |
|---|---|---|---|
| 3,426,098 | 2/1969 | Meyer et al. | 525/424 |
| 3,652,471 | 3/1972 | Sattler | 525/424 |
| 3,697,471 | 10/1972 | Schmidt et al. | 260/33.4 P |
| 3,752,791 | 8/1973 | Zecher et al. | 525/424 |
| 3,852,106 | 12/1974 | Incremona et al. | 525/424 |
| 3,922,252 | 11/1975 | Helub et al. | 525/424 |
| 3,929,714 | 12/1975 | Schmidt et al. | 260/33.4 P |
| 4,137,221 | 1/1979 | Hara et al. | 528/273 |

OTHER PUBLICATIONS

U.K. Patent Office Search of Feb. 18, 1981.

Primary Examiner—Theodore E. Pertilla
Attorney, Agent, or Firm—Oblon, Fisher, Spivak, McClelland & Maier

[57] ABSTRACT

A polyamideimide-esterimide heat resistant resin is made by connecting aromatic polyamideimide components having amide groups and imide groups in the main chain to polyesterimide components having ester groups and imide groups in the main chain by esterification.

12 Claims, No Drawings

POLYAMIDEIMIDE-ESTERIMIDE HEAT RESISTANT RESIN AND ELECTRIC INSULATING VARNISH

DETAILED DESCRIPTION OF THE INVENTION

The present invention is to provide a polyamideimide-esterimide heat resistant resin which is made by connecting aromatic polyamideimide components having amide groups and imide groups in the main chain to polyesterimide components having ester groups and imide groups in the main chain by esterification.

After the reaction the heat resistant resin of the present invention can be used without any separation from a solvent and also can be used by separating from a solvent for the other uses. The separation from the solvent for the reaction can be carried out by the conventional process, preferably by adding a desired poor solvent to the reaction mixture to precipitate white to pale brown powder of the heat resistant resin.

The resulting heat resistant resin of the present invention is the chain polymer having chains or branched chains of polyamide-imide components and polyesterimide components which are alternately connected by ester groups.

According to the infrared spectrum, the characteristic absorption for amide groups, imide groups and ester groups are found. The heat resistance of the resin is depending upon the kind and amount of the components for the production and can be excellent heat resistance that the temperature for 50% weight loss in air is about 450° to 550° C. and TGI (NEMA Pub. No. RE-1, 1974) is about 430° to 480° C.

The resin of the present invention is soluble in various solvents such as phenol, cresol, xylenol, N-methyl-2-pyrrolidone, dimethylacetamide, dimethylformamide, dimethylsulfoxide and N-methylcaprolactam to form a transparent viscous solution. For example, it has Gardner-Holdt viscosity of $Z_2$ to $Z_5$ measured at 30° C. as a 35 weight % solution in cresol.

The resin of the present invention has terminal hydroxyl groups and/or terminal carboxyl groups. When the resin having such terminal functional groups is heated in the presence or in the absence of a curing agent at a desired temperature, a strong film or molding compound having various excellent characteristics such as heat resistance and chemical resistance can be obtained by the curing. Thus, the resin of the present invention can be used not only for the electric insulating varnish but also various other uses for requiring heat resistance.

The typical polyamideimides are formed by combinations of the following components.

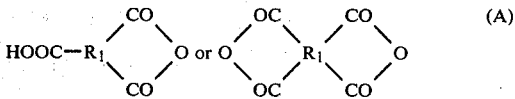

wherein $R_1$ represents benzene, benzophenone diphenyl, diphenylmethane or naphthalene ring;

wherein $R_2$ represents benzene or benzophenone ring; and

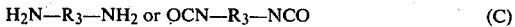

wherein $R_3$ represents diphenylmethane, diphenylether, diphenylsulphone, toluene, xylene, diphenyl, diphenylsulfide or naphthalene ring.

The typical structures of the polyamides can be shown as follows.

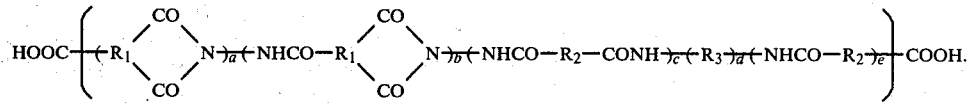

The typical polyesterimides are formed by combinations of the following components.

$$XOC—R_4—COX \quad (D)$$

wherein X represents hydroxyl, methyl or hydroxyethyl group; $R_4$ represents benzene ring or butylene group;

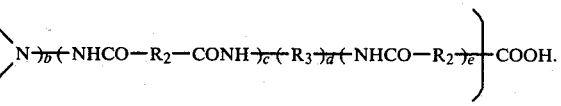

wherein $R_1$ and $R_3$ are defined above;

wherein $R_5$ is ethylene, butylene or bisethylterephthalate group in the case of n=2; and is propylene, trimethylmethane, trimethylethane, trimethylpropane or tris-(ethyl)isocyanurate group in the case of n=3; and tetramethylmethane group in the case of n=4.

The typical structures of the polyesterimides can be shown as follows.

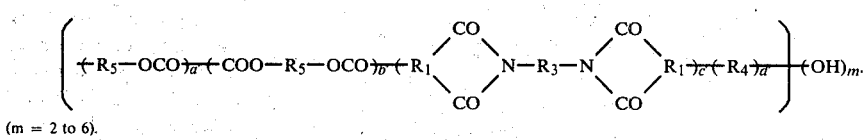

(m = 2 to 6).

The present invention relates to an electric insulating varnishes for preparing enamelled wires having excellent insulating properties.

Many coating compositions for electric insulating varnishes have been known and widely used. Various chemical compound have been used depending upon the uses. Thus, in view of requirements for compact, light weight and high function of electric equipments, it has been required to develop electric insulating varnishes having higher functions. The conventional varnishes such as are mainly used, terephthalic acid polyester varnishes and polyesterimide varnishes. The polyester varnishes have some disadvantages such as inferior abrasion resistance, heat shock resistance and thermal endurance. The polyesterimide varnishes have relatively superior characteristic to those of the polyester varnishes, however they still have not satisfactory characteristics and especially have inferior refrigerant resistance and crazing property.

As the varnishes having high characteristics, polyimide varnishes and polyamideimide varnishes have been known. These varnishes are remarkably expensive and the handling of the varnishes is remarkably complicated whereby these varnishes have not been used widely but only for special uses.

The varnishes comprising, as a main component, a polyamideimide-ester resin comprising a dibasic acid having amide groups and imide groups as an acid component of a polyester have been also known in Japanese Examined Patent Publication Nos. 13597/1970, 18316/1970, 5089/1971, 26116/1972, 7689/1976 and 15859/1976. Thus, the enamelled wires coated with the varnish of such resin can impact certain desirable properties to some extent while are not satisfactory in some other mechanical properties and thermal properties, especially refrigerant resistance and crazing property.

As a result of various studies for overcoming the disadvantage of the prior art, it has been found that these disadvantages in the prior arts can be overcome by using the polyamideimide-esterimide resin having a specific structure to prepare varnishes by the conventional process. The present invention has been completed by the finding.

The present invention is to provide the varnish comprising a solvent and a film forming component, said film forming component comprising, as a main component, a polyamideimide-esterimide heat resistant resin, made by connecting aromatic polyamideimide components having amide groups and imide groups in the main chain to polyesterimide components having ester groups and imide groups in the main chain by esterification.

The present invention will be illustrated in detail. The main characteristics of the present invention is to use a specific resin, that is the block copolymer made by bonding the specific polyamideimide prepolymer (oligomer) to the specific polyesterimide prepolymer by esterification.

According to the present invention, excellent mechanical properties, heat resistance, refrigerant resistance and crazing property can be imparted to the enamelled wire.

The process for producing the block copolymer which is useful for the present invention to provide the characteristics of the present invention will be illustrated in detail.

The polyamideimide prepolymer used in the process, has at least two terminal carboxyl groups and it is obtained by reacting a polycarboxylic acid with a primary diamine or diisocyanate in the presence of excess of the acid based on equivalents of the diamine or diisocyanate.

The typical polycarboxylic acid used for the production of the prepolymer include trimellitic acid, pyromellitic acid, benzophenonetricarboxylic acid, diphenyl tricarboxylic acid, diphenylmethane tricarboxylic acid, benzophenone tetracarboxylic acid, diphenyl tetracarboxylic acid, bistrimellitic acid, naphthalene tetracarboxylic acid and derivatives thereof, phthalic acid, terephthalic acid, isophthalic acid, benzophenone dicarboxylic acid and derivatives thereof.

It is optimum to use a mixture of trimellitic anhydride and terephthalic acid or isophthalic acid as the polycarboxylic acid at a molar ratio of about 0.3 to 0.8:0.7 to 0.2.

The typical diamines and diisocyanates used for the reaction with the polycarboxylic acid, include 4,4'-diaminodiphenyl methane, 4,4'-diaminodiphenyl ether, 4,4'-diaminodiphenyl sulfone, tolylenediamine, xylylenediamine, benzidine, 4,4'-diaminodiphenyl sulfide, diaminonaphthalene, 4,4'-phenylene diamine and derivatives thereof.

The diisocyanates corresponding to said diamines are typical diisocyanates. The diamine or the diisocyanate is preferably used at a molar ratio of 1:0.6 to 0.95 based on the polycarboxylic acid.

The reaction of the polycarboxylic acid with the diamine or diisocyanate is preferably carried out at about 100° to 250° C. for about 1 to 10 hours in an inert solvent such as N-methyl-2-pyrrolidone, N,N'-dimethylacetoamide, tetramethylene sulfone, phenol, cresol or xylenol to attain the polycondensation.

In the process of the present invention, it is preferable to select the condition of the polycondensation so as to give the polyamideimide prepolymer having an acid value of about 15 to 150. The resulting polyamideimide prepolymer is a powder having at least two terminal carboxyl groups (or derivatives thereof). In the process of the present invention, it is not always necessary to separate the product from the solvent. The reaction mixture can be used for the following reaction.

The other prepolymer as the other component of the block copolymer used in the present invention is a prepolymer having at least two terminal hydroxyl group and both of ester groups and imide groups in the main chain and can be obtained by the following process.

In the production of a polyester by a reaction of a polycarboxylic acid with an excess of a polyol, based on equivalents of the polycarboxylic acid, the polyesterimide prepolymer is produced by using a condensation product obtained by a reaction of a polycarboxylic acid having at least three carboxyl groups as at least part of the polycarboxylic acid with a diamine or diisocyanate at a molar ratio of 2:1 or by using the raw materials for forming said condensation product, the polyol and the polycarboxylic acid. Such polyesterimide prepolymer can be produced by the processes disclosed in Japanese Patent Publication Nos. 21500/1963, 33146/1970 and 40113/1976.

The polyesterimide prepolymer used in the process of the present invention should not be the high molecular weight compounds such as one disclosed in said prior arts and should be prepolymer having relatively low molecular weight and having desired terminal hydroxyl groups.

The typical polyols used for the production of the polyesterimide prepolymers include ethylene glycol, 1,4-Butane diol, bis-hydroxyethyl terephthalate, glycerine, trimethylolmethane, trimethylolethane, trimethlolpropane, penta erythritol, tris-(2-hydroxyethyl)isocyanurate etc.

On the other hand, the typical polycarboxylic acids include phthalic acid, isophthalic acid, terphthalic acid, adipic acid and derivatives thereof.

The carboxylic acid having at least three carboxyl groups can be the compounds for forming the polyamideimide prepolymers and the diamines and diisocyanates for forming imide groups are also the compounds for forming the polyamideimide prepolymers.

In the production of the polyesterimide prepolymers from the above-mentioned polyol, polycarboxylic acid, the diamine or diisocyanate an excess, preferably about 20 to 80% excess of polyol based on equivalents of the polycarboxylic acid is admixed with the other raw materials and a catalyst in the absence or the presence of a solvent to react them at a temperature of about 130° to 200° C. for about 2 to 10 hours. At the time hydroxyl value and viscosity of the product reaching to the predetermined values, the reaction mixture is cooled or the reaction mixture is diluted to stop the growth of the prepolymer whereby the object polyesterimide prepolymer is obtained. If the end point of the reaction is determined by the preliminary test, the polyamideimide prepolymer is added to the reaction mixture, or the polyesterimide prepolymer is added to the polyamideimide prepolymer to start the block copolymerization without interrupting the reaction.

The most important feature for the producing the polyesterimide prepolymer is to decide the amounts of the raw materials so as to give the hydroxyl value of the resulting prepolymer of more than about 120, preferably about 150 to 300 and to stop the growth of the prepolymer at the time the Gardner-Holdt viscosity measured at 30° C. as a cresol solution having solids content of 32 weight % reaching to K-Q as the polymerization degree of the prepolymer.

The polyol is preferably used at an excess amount based on equivalents of the polycarboxylic acid (including the dicarboxylic aid having imide group), for example 20 to 80 excess equivalent %. The desired polymerization degree can be easily given by controlling the condition for the reaction such as the reaction time or the reaction temperature. As the amount of the imide groups in the polyesterimide prepolymer, it is preferable to give the equivalent of the acid of the condensation product of trimellitic anhydride and 4,4'-diaminodiphenyl methane (molar ratio 2:1) at an equivalent ratio of about 5 to 60% based on the total acids. When it is lower than the minimum range, the heat-shock and the refrigerant resistance may be inferior whereas when it is higher than the maximum range, the flexibility and adhesion may be inferior.

The block copolymerization of the polyamideimide prepolymer and the polyesterimide prepolymer by esterification is carried out by mixing the polyamideimide prepolymer with the polyesterimide prepolymer in the presence of an esterification catalyst and a solvent if necessary and reacting them at about 170° to 250° C. for about 3 to 12 hours.

The most important feature is the ratio of the polyamideimide prepolymer to the polyesterimide prepolymer. The optimum ratio of the former to the total prepolymer is in a range of about 10 to 60 weight %:90-40%. When it is lower than the minimum range, the heat-shock, refrigerant resistance and crazing property may be inferior whereas it is higher than the maximum range, the flexibility and adhesion may be inferior.

The block copolymers used in the present invention can be produced by adding the polyamideimide prepolymer during the production of the polyesterimide prepolymer as described in Examples 6 and 7.

In such embodiment, the reactants should be selected to firstly react the components for forming the polyesterimide prepolymer and then to react the resulting prepolymer with the polyamideimide prepolymer in the reaction system.

The resulting polyamideimide-polyesterimide resin can be used after separating the solvent and also can be used without separating the solvent and after adding a desired solvent to give a solid content of about 20 to 50 weight %, preferably about 25 to 40 weight % to form an electric insulating varnishes of the present invention.

The suitable solvent used in the present invention include phenolic solvents such as phenol and o-, m- or p-cresol or xylenols. It is optimum to use cresol, which can be a mixture of isomers of cresol and also may contain phenol and xylenol.

The workability of the varnish of the present invention will be further improved by using a diluent such as benzene, toluene, xylene, ethylbenzene, diethylbenzene, isopropylbenzene, coal tar naphtha, petroleum naphtha and solvent naphtha together with the above-mentioned solvent. The diluent is usually used at a ratio of 0 to 30 weight %, preferably about 5 to 20 weight % based on the total weight of the solvent and the diluent.

The indispensable components for the varnish of the present invention are described above. The other additives can be added if necessary. One of the additives is a metal drier for improving the workability. The typical metal driers can be linolates, resinates, naphthenates, acetates, benzoates, octoates, threonates, stearates and acetylacetonnates of aluminum, calcium, cobalt, lead manganese, titanium, vanadium, zinc and zirconium. The optimum metal driers are titanium and zirconium compounds. The titanium compounds include tetraalkyl titanates such as tetraisopropyl titanate, tetrabutyl titanate, tetrahexyl titanate, tetramethyl titanate; titanium chelates such as octyleneglycol titanate, triethanolamine titanate and 2,4-pentadiene titanate obtained by reacting octyleneglycol, triethanolamine or 2,4-pentadiene with titanate; and tetrastearyl titanium acylate obtained by reacting stearic acid with titanate. The zirconium compounds include tetraalkyl zirconate, zirconium chelates and zirconium acylates corresponding to the titanium compound. The metal drier is incorporated at a ratio of about 0.1 to 6.0 weight %, preferably about 1 to 4 weight % based on the solids of the varnish.

The other additive is a blocked polyisocyanate. Suitable blocked polyisocyanates include the compounds obtained by blocking an isocyanate such as 2,4-tolylenediisocyanate, 2,5-tolylenediisocyanate, m-phenylenediisocyanate, 1,6-hexamethylenediisocyanate, 2,6-tolylenediisocyanate as aromatic trimers; 4,4'-diphenylmethane diisocyanate or 1,3,5-triisocyanatebenzene by the conventional process; or reaction product of 2,4-tolylenediisocyanate and 2,6-tolylenediisocyanate with trimethylolpropane blocked by phenol or analogous compounds. The blocked polyisocyanate is incorporated at a ratio of about 10 to 40 weight % preferably about 10 to 20 weight % based on solids of the varnish.

Various electric characteristics of the varnishes of the present invention can be improved by incorporating a formaldehyde resin such as melamine-formaldehyde resin, phenol-formaldehyde resin, cresol-formaldehyde resin or xylenol-formaldehyde resin to above-mentioned components at a ratio of about 1 to 20 weight % based on the solids of the varnish together. It is optimum to incorporate phenol-formaldehyde resin.

The polyisocyanate and formaldehyde resin have been used for improving the heat deterioration resistance of the conventional varnishes. In the present invention, various properties can be further improved by incorporating such additives.

In accordance with the resulting varnishes of the present invention, the insulating coated film having the highest grade can be obtained to give excellent electric characteristics such as refrigerant resistance, crazing property, abrasion resistance, heat shock resistance and heat deterioration resistance, especially remarkably high refrigerant resistance and crazing property superior to those of the conventional polyester, polyesteramide-imide and polyesterimide electric insulating varnishes.

The present invention will be further illustrated by certain examples and references which are provided for purposes of illustration only. Unless otherwise indicated, all "parts" and "percentages" are by weight.

REFERENCE 1

In a 2 liter three necked flask, 295 parts of N-methylpyrrolidone, 115 parts of trimellitic anhydride and 66 parts of isophthalic acid were added and 175 parts of 4,4'-diphenylmethane diisocyanate was added to mixture with stirring to react them at about 150° to 170° C. for 2 hours to obtain 288 parts of polyamideimide oligomer having a molecular weight of about 2,800 and an acid value of about 114. The infrared spectrum of the oligomer had the characteristic absorption of amide groups and imide groups.

REFERENCE 2

In a 2 liter three necked flask, 349 parts of N-methylpyrrolidone, 161 parts of benzophenonetetracarboxylic anhydride and 83 parts of isophthalic acid were added and heated at 100° C. and 175 parts of 4,4'-diphenylmethane diisocyanate was added to mixture with stirring to react them at 150° to 170° C. for 2 hours to obtain 350 parts of polyamideimide oligomer having a molecular weight of about 3,500 and an acid value of about 94. The infrared spectrum of the oligomer had characteristic absorption of amide groups and imide groups.

REFERENCES 3 TO 5

In accordance with the process of Reference 1 except using the starting materials shown, each polyamideimide prepolymer was obtained.

|  | Reference 3 | | Reference 4 | | Reference 5 | |
| --- | --- | --- | --- | --- | --- | --- |
| Trimellitic anhydride | 76.8 | parts | 134.5 | parts | 153.7 | parts |
| Isophthalic acid | 99.7 | parts | 49.8 | parts | 33.2 | parts |
| 4,4'-diphenylmethane diisocyanate | 162.5 | parts | 237.5 | parts | 200.0 | parts |
| Acid value | 139 | | 16.5 | | 71 | |
| Molecular weight | 800 | | 6,600 | | 1,500 | |

EXAMPLE 1

In a 2 liter three necked flask, 298 parts of cresol, 69.4 of ethylene glycol, 194.9 parts of tris-(2-hydroxyethyl)isocyanurate, 217.3 parts of dimethyl terephthalate and 0.7 parts of litharge were added and heated at 100° C. and 107.5 parts of trimellitic anhydride and 55.5 parts of 4,4'-diaminodiphenyl methane were added to mixture with stirring to react them at 180°–220° C. Sometimes, the reaction mixture was sampled and the samples were diluted with cresol to a solids content of 32 weight % diluted. When the Gardner-Holdt viscosity of the 32% solution reached M-O, the temperature of the reaction mixture was reduced to 100° C. The reaction mixture was admixed with 138.2 parts of the polyamideimide oligomer powder obtained in Reference 1 to react them at 180° to 200° C. for 5 hours to obtain a transparent viscous solution. The viscous solution was diluted with mixed solvent of cresol and solventnaphtha to give a solids content of 35% and then, tetrabutyl titanate was added at a ratio of 2% based on the solids content to obtain the electric insulating varnish of the present invention.

EXAMPLE 2

In a 2 liter three necked flask, 300 parts of cresol, 59.5 parts of ethylene glycol, 167 parts of tris-(2-hydroxyethyl)isocyanurate, 139.7 parts of dimethyl terephthalate and 0.7 parts of litharge were added and heated at 100° C., and 184.3 parts of trimellitic acid anhydride and 90.2 parts of 4,4'-diaminodiphenylmethane were added to mixture with stirring to react them at 180° to 220° C. Sometimes, the reaction mixture was sampled and the samples were diluted with cresol to a solids content of 32%. When the Gardner-Holdt viscosity of the 32% solution reached M-O, the temperature of the reaction mixture was reduced to 100° C. The reaction mixture was admixed with 140.2 parts of the polyamideimide oligomer powder obtained in Reference 1 to react them at 180° to 200° C. for 5 hours to obtain a transparent viscous solution. The viscous solution was diluted with mixed solvent of cresol and solventnaphtha to give a solids content of 35% and then, tetrabutyl titanate was added at a ratio of 2% based on the solids content to obtain can electric insulating varnish of the present invention.

EXAMPLE 3

In accordance with the process of Example 2, except using the polyamideimide oligomer obtained in Reference 2 instead of the oligomer used in Example 2, an electric insulating varnish was prepared.

EXAMPLE 4

In a 2 liter three necked flask, 30 parts of cresol, 47.1 parts of ethylene glycol, 132.2 parts of tris-(2-hydroxyethyl) isocyanurate, 110.6 parts of dimethyl terephthalate and 0.7 parts of lithage were added and 145.9 parts of trimellitic anhydride and 71.4 parts of 4,4'-diaminodiphenyl methane were added to the mixture with stirring to react them at 150° C. Sometimes, the reaction mixture was sampled and the samples were diluted with cresol to a solids content of 32%. When the Gardner-Holdt viscosity of 32% solution reached M-O, the temperature of the reaction mixture was reduced to 100° C. The reaction mixture was admixed with 141.6 parts of the polyamideimide oligomer powder obtained in Reference 1 to react them at 180° to 200° C. for 5 hours to obtain a transparent viscous solution. The viscous solution was diluted with mixed solvent of cresol and solvent naphtha to give a solids content of 35% and then, tetrabutyl titanate was added at a ratio of 2% based on the solids content to obtain an electric insulating varnish of the present invention.

EXAMPLE 5

In a 2 liter three necked flask, 303 parts of cresol, 47.1 parts of ethylene glycol, 132.2 parts of tris-(2-hydroxyethyl)isocyanurate, 110.6 parts of dimethyl terephthalate and 0.7 parts of litharge were added and 145.9 parts of trimellitic anhydride and 71.4 parts of 4,4-diaminodiphenylmethane were added to the mixture with stirring to react them at 150° C. Sometimes, the reaction mixture was sampled and the samples were diluted with cresol to a solids content of 32%. When the Gardner-Holdt viscosity of 32% solution reached M-O, the temperature of the reaction mixture was reduced to 100° C. The reaction mixture was admixed with 282.9 parts of the polyamideimide oligomer powder obtained in Reference 1 to react them at 180° to 200° C. for 5 hours to obtain a transparent viscous solution. The viscous solution was diluted with mixed solvent of cresol and solvent naphtha to give a solids content of 35% and then, tetrabutyl titanate was added at a ratio of 2% based on the solids content to obtain an electric insulating varnish of the present invention.

EXAMPLE 6

In a 2 liter three necked flask, 330 parts of cresol, 59.5 parts of ethylene glycol, 139.7 parts of dimethyl terephthalate and 0.7 part of litharge were charged and heated at 100° C. and 184.3 parts of trimellitic acid anhydride and 90.2 parts of 4,4'-diaminodiphenylmethane were added to the mixture with stirring to react them at 150° C. for 3 hours and then, the temperature was reduced to 100° and 140.2 parts of the polyamideimide oligomer obtained in Reference 3 and 167.0 parts of tris-(2-hydroxyethyl) isocyanurate were added to react them at 180° to 200° C. for 5 hours to obtain a transparent viscous solution. The solution was admixed with a mixed solvent of cresol and naphtha to give a solid content of 35% and then, tetrabutyl titanate was added at a ratio of 2% based on the solid component to obtain an insulating paint of the present invention.

EXAMPLE 7

In a 2 liter three necked flask, 300 parts of cresol, 59.5 parts of ethyleneglycol, 167.0 parts of tris-(2-hydroxyethyl) isocyanurate, 139.7 parts of dimethyl terephthalate and 140.2 parts of the polyamideimide prepolymer obtained in Reference 4 were added and heated at 100° C. and then 184.3 parts of trimellitic anhydride and 90.2 parts of 4,4'-diaminodiphenyl methane were added to mixture with stirring to react them at 180° to 220° C. for 7 hours to obtain a transparent viscous solution. The solution was diluted with a mixed solvent of cresol and solvent naphtha to give a solids content of 35% and then, tetrabutyl titanate was added at a ratio of 2% based on the solids contents to obtain an electric insulating varnish of the present invention.

EXAMPLE 8

In accordance with the process of Example 1 except using 368.5 parts of the polyamideimide prepolymer obtained in Reference 5 instead of the polyamideimide prepolymer used in Example 1, an electric insulating varnish of the present invention was prepared.

EXAMPLE 9

In accordance with the process of Example 1 except using 552.8 parts of the polyamideimide prepolymer obtained in Reference 3 instead of the polyamideimide prepolymer used in Example 1, an electric insulating varnish of the present invention was prepared.

EXAMPLE 10

In accordance with the process of Example 2 except using 560.1 parts of the polyamideimide prepolymer obtained in Reference 4 instead of the polyamideimide prepolymer used in Example 2, an electric insulating varnish of the present invention was prepared.

COMPARATIVE REFERENCE 1

In a reactor, 353 parts of dimethyl terephthalate, 153 parts of ethylene glycol, 52 parts of glycerine and 0.3 parts of litharge were added and heated to be 200° C. over a period of 10 hours and then, 60 parts of cresol was added to mixture and the mixture was cooled to 100° C. The reaction mixture was admixed with 499 parts of trimellitic anhydride and 257 parts of 4,4'-diaminodiphenyl methane to react them at 200° to 210° C. for 3 hours to obtain a transparent viscous solution. A mixed solvent of cresol and solvent naphtha was added to the solution to give a solids content of 35% and tetrabutyl titanate was added at a ratio of 2% based on the solids content to obtain an electric insulating varnish of this Reference.

COMPARATIVE REFERENCE 2

In a reactor, 470 parts of cresol, 146 parts of ethylene glycol, 584 parts of tris-(2-hydroxyethyl) isocyanurate, 499 parts of dimethyl terephthalate, 377 parts of trimellitic anhydride and 194 parts of 4,4'-diaminodiphenyl methane were added and heated to be 220° C. over a period of 15 hours to react them for 3 hours at this temperature to obtain a transparent viscous solution. A mixed solvent of cresol and solvent naphtha was added to the solution to give a solids content of 35% and tetrabutyl titanate was added at a ratio of 2% based on the solids content to obtain an electric insulating varnish of this Reference.

COMPARATIVE REFERENCE 3

A resin obtained by the process of Example 1 of Japanese Patent Publication No. 13597/1970 was diluted with a mixed solvent of cresol and solvent naphtha to give a solids content of 35% and tetrabutyl titanate was added at a ratio of 2% based on the solids content to obtain an electric insulating varnish of this Reference.

COMPARATIVE REFERENCE 4

In accordance with the process of Example 5 except that 4,4'-diaminodiphenyl methane was not used and the amount of dimethyl terephthalate was 184.3 parts, an electric insulating varnish was prepared. The varnish was mixed with the same amount of the varnish of Comparative Reference 2 to obtain an electric insulating varnish of this Reference.

The resulting varnishes of Examples 1 to 10 and Comparative References 1 to 4 were respectively used to coat on 1.0 mm$\phi$ copper wire by the dies method so as to attain the class I coating for the thickness and cured them.

The test for the evaluation of the enamelled wires were carried out by Japanese Industrial Standard C 3214 for Polyesterimide Enamelled Copper wires.

The results of the test are shown in Table 1. As it is clear from Table 1, the electric insulating varnishes of the present invention had superior heat shock-resistance, heat deterioration resistance, abrasion resistance, refrigerant resistance and crazing property to those of the electric insulating varnishes of Comparative References.

TABLE 1

| Item | Exp. 1 | Exp. 2 | Exp. 3 | Exp. 4 | Exp. 5 |
|---|---|---|---|---|---|
| Thickness (mm) | 0.038 | 0.038 | 0.038 | 0.038 | 0.038 |
| Flexibility | | | | | |
| initial | 1d O.K | 1d O.K | 1d O.K | 1d O.K | 1d O.K |
| after 20% Elong. | 1d O.K | 1d O.K | 2d O.K | 1d O.K | 2d O.K |
| Reciprocating Scrape | | | | | |
| 600 gr load - strokes | 58 | 63 | 76 | 72 | 88 |
| Breakdown Voltage | | | | | |
| initial (KV) | 12.8 | 12.0 | 12.4 | 12.6 | 13.0 |
| after 168 hours at 240° C. | 10.1 | 10.2 | 11.0 | 9.0 | 12.1 |
| Softening-resistance | | | | | |
| 2 Kg.-load (°C.) | 396 | 382 | 388 | 325 | 360 |
| 2° C./min. rise | 392 | 385 | 380 | 330 | 363 |
| Heat shock resistance | | | | | |
| 220° C., 1 hr. | 2d O.K | 1d O.K | 1d O.K | 2d O.K | 1d O.K |
| 240° C., 1 hr. | 2d O.K | 1d O.K | 1d O.K | 4d O.K | 1d O.K |
| Chemical-resistance | | | | | |
| 3% NaOH | 5H | 5H | 5H | 4H | 5H |
| Benzene | 5H | 5H | 6H | 5H | 5H |
| Reagent-resistance blister temperature 72 hrs. soaking in R-22 at 70° C. (°C.) | 140 | 150 | 160 | 140 | 160 |
| Crazing property after 3% Elong. pinhole test method | 0 0 | 0 0 | 0 0 | 0 0 | 0 0 |

| Item | Exp. 6 | Exp. 7 | Exp. 8 | Exp. 9 | Exp. 10 |
|---|---|---|---|---|---|
| Thickness (mm) | 0.039 | 0.039 | 0.038 | 0.038 | 0.038 |
| Flexibility | | | | | |
| initial | 1d O.K | 1d O.K | 1d O.K | 1d O.K | 1d O.K |
| after 20% Elong. | 2d O.K | 1d O.K | 2d O.K | 2d O.K | 3d O.K |
| Reciprocating Scrape | | | | | |
| 600 gr load-strokes | 60 | 68 | 83 | 90 | 92 |
| Breakdown Voltage | | | | | |
| initial (KV) | 12.2 | 12.8 | 12.0 | 12.6 | 12.8 |
| after 168 hours at 240° C. | 12.0 | 10.6 | 11.0 | 11.2 | 11.4 |
| Softening-resistance | | | | | |
| 2 Kg.-load (°C.) | 375 | 385 | 363 | 360 | 359 |
| 2° C./min. rise | 380 | 388 | 370 | 365 | 363 |
| Heat shock resistance | | | | | |
| 220° C., 1 hr. | 1d O.K | 1d O.K | 1d O.K | 1d O.K | 1d O.K |
| 240° C., 1 hr. | 2d O.K | 2d O.K | 1d O.K | 1d O.K | 1d O.K |
| Chemical-resistance | | | | | |
| 3% NaOH | 5H | 5H | 5H | 5H | 5H |
| Benzene | 5H | 5H | 5H | 5H | 5H |
| Reagent-resistance blister temperature 72 hrs. soaking(°C.) in R-22 at 70° C. | 150 | 150 | 150 | 160 | 160 |
| Crazing property after 3% Elong. pinhole test method | 0 0 | 0 0 | 0 0 | 0 0 | 0 0 |

| Item | Ref. 1 | Ref. 2 | Ref. 3 | Ref. 4 |
|---|---|---|---|---|
| Thickness (mm) | 0.039 | 0.039 | 0.039 | 0.038 |
| Flexibility | | | | |
| initial | 1d O.K | 1d O.K | 1d O.K | 1d O.K |
| after 20% Elong. | 1d O.K | 2d O.K | 2d O.K | 3d O.K |
| Reciprocating Scrape | | | | |
| 600 gr load-strokes | 53 | 46 | 45 | 62 |
| Breakdown Voltage | | | | |
| initial (KV) | 12.4 | 12.2 | 11.4 | 11.7 |
| after 168 hours at 240° C. | 5.8 | 9.6 | 6.3 | 9.8 |
| Softening-resistance | | | | |
| 2 Kg.-load (°C.) | 305 | 380 | 350 | 358 |
| 2° C./min. rise | 310 | 382 | 348 | 350 |
| Heat shock resistance | | | | |

TABLE 1-continued

| | | | | |
|---|---|---|---|---|
| 220° C., 1 hr | 4d out | 2d O.K | 4d out | 1d O.K |
| 240° C., 1 hr | 4d out | 4d O.K | 4d out | 2d O.K |
| Chemical-resistance | | | | |
| 3% NaOH | 3H | 5H | 4H | 5H |
| Benzene | 3H | 5H | 4H | 5H |
| Reagent-resistance blister temperature 72 hrs. soaking(°C.) in R-22 at 70° C. | 110 | 130 | 120 | 130 |
| Crazing property after 3% Elong. pinhole test method | 0 1 | 8 10 | 3 5 | 4 5 |

We claim:

1. A polyamideimide-esterimide heat resistant resin prepared by condensing by esterification an aromatic polyamideimide containing amide groups and imide groups in the main chain thereof and a polyesterimide containing ester groups and imide groups in the main chain thereof.

2. The polyamideimide-esterimide heat resistant resin according to claim 1, wherein from 10 to 60 weight % of said aromatic polyamideimide is condensed with from 90 to 40 weight % of said polyesterimide.

3. The polyamideimide-esterimide heat resistant resin according to claim 1 wherein said polyamideimide component has a molecular weight of about 700 to 7000.

4. A process for producing a polyamideimide-esterimide heat resistant resin which comprises reacting a polyamideimide prepolymer having amide groups and imide groups in the main chain thereof and having at least two terminal carboxyl groups with a polyesterimide prepolymer having ester groups and imide groups in the main chain thereof and having at least two terminal hydroxyl groups.

5. The process according to claim 4 wherein said polyamideimide prepolymer has an acid value of 15 to 150 and said polyesterimide prepolymer has a hydroxyl value of 150 to 300.

6. An electric insulating varnish, which comprises: a polar organic solvent and a film forming component, said film forming component comprising, as the principle component, a polyamideimide-esterimide heat resistant resin prepared by condensing by esterification an aromatic polyamideimide containing amide groups and imide groups in the main chain thereof and a polyesterimide containing ester groups and imide groups in the main chain thereof.

7. The varnish according to claim 6 wherein said heat resistant resin comprises said polyamideimide component at a ratio of about 10 to 60 weight %.

8. The varnish according to claim 6 wherein said polyamideimide component has a molecular weight of about 700 to 7000.

9. The varnish according to claim 6 which further comprises an alkyl titanate.

10. The varnish according to claim 6 which further comprises an organic polyisocyanate.

11. The varnish according to claim 6 which further comprises at least one formaldehyde resin selected from the group consisting of a melamine-formaldehyde resin, a phenol-formaldehyde resin, a cresol-formaldehyde resin and xylenol-formaldehyde resin.

12. The varnish according to claim 6 which further comprises an alkyl titanate, an organic polyisocyanate and a a phenol-formaldehyde resin.

* * * * *